US012661607B2

(12) United States Patent
Nenno et al.

(10) Patent No.: US 12,661,607 B2
(45) Date of Patent: Jun. 23, 2026

(54) FILTER DEVICE

(71) Applicant: HYDAC Filtertechnik GmbH, Sulzbach / Saar (DE)

(72) Inventors: Alexander Nenno, Marpingen (DE); Andre Michael Schneider, Saarbrücken (DE); Klaus Morgens, Trier (DE); Marco Tassone, Saarbrücken-Eschberg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 381 days.

(21) Appl. No.: 18/558,850

(22) PCT Filed: Jan. 20, 2022

(86) PCT No.: PCT/EP2022/051164
§ 371 (c)(1),
(2) Date: Nov. 3, 2023

(87) PCT Pub. No.: WO2022/233459
PCT Pub. Date: Nov. 10, 2022

(65) Prior Publication Data
US 2024/0226781 A1 Jul. 11, 2024

(30) Foreign Application Priority Data

May 7, 2021 (DE) .................... 10 2021 002 428.1

(51) Int. Cl.
*B01D 29/23* (2006.01)
*B01D 29/58* (2006.01)
*B01D 36/00* (2006.01)

(52) U.S. Cl.
CPC .......... *B01D 29/232* (2013.01); *B01D 29/58* (2013.01); *B01D 36/001* (2013.01); *B01D 2201/298* (2013.01)

(58) Field of Classification Search
CPC ........... B01D 2201/298; B01D 36/001; B01D 29/232; B01D 29/58
See application file for complete search history.

(56) References Cited

U.S. PATENT DOCUMENTS 7,279,091 B2 10/2007 Sann et al. .................... 210/130
11,219,847 B2 1/2022 Olschok et al.
(Continued)

FOREIGN PATENT DOCUMENTS

DE 10105612 A1 8/2002 ............. B01D 27/10
DE 102014000903 B4 7/2015 ............. B01D 29/11
(Continued)

OTHER PUBLICATIONS

Search Report for International Patent Application No. PCT/EP2022/051164, 5 pages, Mar. 22, 2022.

*Primary Examiner* — Bradley R Spies
(74) *Attorney, Agent, or Firm* — Slayden Grubert Beard PLLC

(57) ABSTRACT

The invention relates to a filter device at least consisting of two coaxially arranged filter elements (12, 14) which delimit a cavity (16) between them, characterised in that the inner side (18) of the outer filter element (14), which faces the cavity (16), has at least in some parts a separating arrangement (20) for gas bubbles such as air bubbles, and the cavity (16) opens at the head end into at least one discharge opening (22) for gas bubbles coming in.

11 Claims, 3 Drawing Sheets

(56)  References Cited

U.S. PATENT DOCUMENTS

| | | | | |
|---|---|---|---|---|
| 11,458,421 | B2 | 10/2022 | Wohlers et al. | |
| 2019/0321758 | A1 | 10/2019 | Kitajima ................ | B01D 29/58 |
| 2020/0016519 | A1* | 1/2020 | Ishizuka ................ | B01D 29/88 |
| 2020/0038785 | A1 | 2/2020 | Ishizuka ................ | B01D 29/07 |
| 2020/0038786 | A1 | 2/2020 | Malgorn ................ | B01D 29/15 |

FOREIGN PATENT DOCUMENTS

| | | | | |
|---|---|---|---|---|
| DE | 102017000713 A1 | 7/2018 | ............ | B01D 19/00 |
| DE | 11 2017 005176 | 7/2019 | ............ | B01D 36/00 |
| EP | 3 311 899 | 4/2018 | ............ | B01D 35/02 |
| JP | 2006204988 A | 8/2006 | ............ | B01D 19/00 |
| JP | 2020516454 A | 6/2020 | ............ | B01D 17/02 |

* cited by examiner

FILTER DEVICE

CROSS-REFERENCE TO RELATED APPLICATIONS

This application claims priority to German Patent Application No. 10 2021 002 428.1, filed on May 7, 2021 with the German Patent and Trademark Office. The contents of the aforesaid Patent Application are incorporated herein for all purposes.

TECHNICAL FIELD

The invention relates to a filter device consisting of at least two filter elements arranged coaxially with each other which define a cavity between them.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

Filter devices of the above-mentioned type as a component of hydraulic systems are prior art. To prevent adverse effects on safety-related components, such as valves, hydraulic drives, control elements and the like, it is an essential requirement that the respective filter device ensures a constant quality of the filtered media. Perfect functioning of the filter device located in the system is therefore a basic condition for operational reliability.

DE 101 05 612 A1 shows a filter device with a filter housing and a first filter element arranged therein, through which a medium can flow in a predefinable direction for the purpose of cleaning off particulate contamination, together with a bypass device. In the known solution, a further second filter element is present in coaxial arrangement in addition to the first filter element, the respective filter elements are arranged one behind the other in the direction of flow and when the bypass device becomes effective, the further, inner filter element immediately downstream in the direction of flow performs filtration of the medium, so that when the bypass device is activated and operated, the further filter element takes over main filtration for the medium since the first filter element is essentially no longer available for the filtration process due to the bypass device.

In the filtration of fluids such as hydraulic oil, it regularly happens in practice that air enters the fluid or some other gas enters leading to incompressibility of the fluid along with the resulting disadvantages thereof. In the context of hydraulic circuits, the fluid is routinely fed into a tank and removed from it again, the tank, acting in the manner of a calming section, promoting degassing processes from the fluid; however, in the context of downsizing which is basically desired in technology, the tank volumes are becoming increasingly smaller and the circulation cycles of the fluid into and out of the tank are becoming increasingly shorter, with the result that the time spent stored in the tank is often no longer sufficient to enable safe and reliable degassing to the extent required.

To counteract this problem, degassing devices for filters have already been proposed in prior art, for example according to DE 10 2017 000 713 A1, which generate a negative pressure in the filter housing and in the process remove the air located in the filter housing from it by suction and consequently from the fluid. This counteracts the risk that the stiffness of hydraulic drives or control devices as well as the functional capability of valves may be impaired to the point of failure due to the air entrained in the fluid.

The known filter device uses, among other things, a jet pump as the degassing device which is operated by means of a media flow that is generated in particular by a hydraulic pump, such as a gear pump. In this case, the jet pump can be operated by an external media flow or, in an advantageous manner, by a media flow obtained from the filtrate of the filter device. The known solution is extremely effective in terms of the amount of gas discharged; however, this requires a certain amount of technical equipment effort and, in particular, additional energy to operate the jet pump via the hydraulic pump for the degassing process.

SUMMARY

A need thus exists to provide a filter device which enables effective degassing of a fluid, such as for example hydraulic oil, with little technical equipment effort, for example without having to provide additional drive energy for the degassing device.

The need is addressed by a filter device according to the independent claim(s). Embodiments of the invention are described in the dependent claims, the following description, and the drawings.

DESCRIPTION

Figure 1:
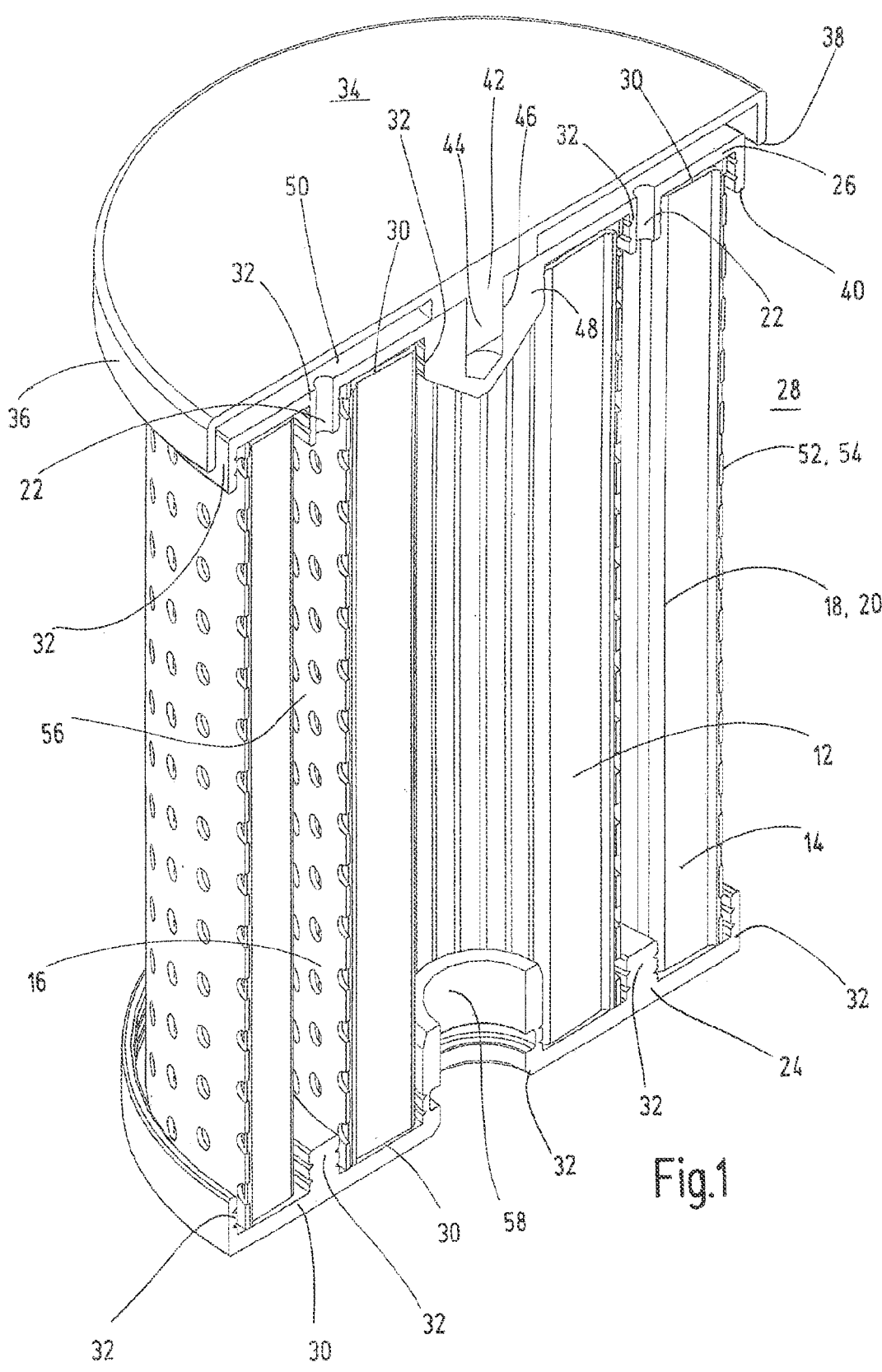
FIG. 1 shows a longitudinal section through an example filter device.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the inside of the outer filter element, which is directed towards the cavity, at least partially forms a separating device for gas bubbles, such as air bubbles, and the cavity opens at the head end into at least one discharge opening for such gas bubbles, with the result that the fluid to be cleaned of particle contamination is effectively degassed without additional drive energy for an additional device, such as a jet pump. While the innermost filter element is substantially used for the aforementioned particle filtration, the outermost filter element, for example in coaxial arrangement, allows a kind of air bubble coalescence on the inside, which is adjacently directed towards the aforementioned cavity between the two filter elements. In this respect, the filter device experiences a supply of unfiltered medium on the inside of the innermost filter element, which flows through from the inside out, in common with the outermost filter element. Routinely, the gas or air bubbles are not present in pure form but are embedded and therefore a component of a fluid or foam containing gas or air to a greater or lesser extent, and the fluid is only degassed after passing through the respective discharge opening, the fluid fractions being discharged in the opposite direction onto the fluid side of the device.

The aforementioned separating device, which forms a kind of barrier layer for gas bubbles, on the inside of the outer filter element, results in a kind of gradual division or graduation according to size of the individual air bubbles and coalescence of the smaller air bubbles into correspondingly large ones until these have reached a size capable of ascending and can therefore be effectively separated at a fluid surface, for example in a storage tank. The respective discharge opening for such gas bubbles, which are smaller in diameter than the diameter of the annular cavity between the elements on the head end of the filter device, promotes a parallel flow through the filter element composite, where it has been shown that the flow velocity in the outer filter element is reduced due to the aforementioned parallel connection, which brings about an improved coalescence effect and thus air separation. With regard to the effects mentioned, in this case the filter device is for example provided for so-called in-tank solutions in which the entire filter device is completely integrated in a tank between different fluid levels.

In some embodiments of the filter device, it is provided that the two filter elements, placed one inside the other, are accommodated at the foot and head end in an end cap in each case and that the respective discharge opening is formed of a passage, such as a drilled hole, in the head-end end cap which connects the cavity between the filter elements to the environment. In particular, when the passages referred to are configured as drilled holes, there is an improved discharge of air bubbles which is also enabled in the form of a fluid-foam mixture with a high air content. In this respect, the fluid to be degassed flows through the filter device from the foot end to its head end.

If the filter device is installed in a tank, the head-end parts of the filter device are located above the tank fluid level so that the part of the filter device located above the fluid level allows a near-surface and calmed outflow, in particular of air, from the hydraulic medium. In this respect, there is a short ascent path to the fluid surface for the air bubbles which promotes rapid separation and the aforementioned passages in the head-end end cap of the filter device allow a channeled discharge of the separated gas, in particular in the form of air bubbles, parallel to the orientation of the element material of the outer filter element. As already explained above, in the proper sense this is fluid or foam with a high air content which flows out of the openings, with the air then being able to degas on the flow path to the fluid surface.

In some embodiments of the filter device, it is provided that the head-end end cap with its respective discharge opening is overlapped with a predefinable gap by a cover cap. It is further for example provided in this case that a circumferential annular gap is formed in the region of the overlap from the cover cap to the head-end end cap, via which annular gap the respective fluid originating from a discharge opening is guided to the outer circumference side of the outer hollow cylindrical filter element. The fluid flowing upwards in this respect via the passages, in particular in the form of the drilled holes, is directed homogeneously outwards by the plate geometry of the cover cap overlapping the head-end end cap, towards the outer supporting tube of the outer filter element, from where it trickles down as a thin film with a high air content towards the respective fluid tank level. The resulting thin film brings the air bubble close to the surface of the environment inside the tank which promotes its separation.

For example it is provided that the outer circumference side of the outer filter element is formed of a perforated supporting tube and the perforation, in particular in the form of holes punched in the supporting tube, results in a braking effect as the trickling down takes place which increases the dwell time and in turn promotes discharge of the air bubbles to the ambient air above the fluid level of the tank.

In some embodiments of the filter device, it is provided that a flow guidance element is arranged on the inside of the inner hollow cylindrical filter element in the region of the head-end end cap. In this case, the flow guidance element is for example configured in the manner of an inwardly tapering cone, the tip of which opens into the interior of the cavity of the inner filter element and which is used to prevent an unwanted accumulation of air bubbles under the end cap in the inner region of the inner filter element.

In this region, the head-end end cap, i.e., in the region of the flow guidance element, is for example connected to the cover cap, may be as part of an adhesive or screw connection; however, it is also possible to form the cover cap and associated end cap from one component, for example as part of an injection moulding process.

In some embodiments of the filter device, it is provided that the two filter elements with their end caps and the cover cap form a replaceable assembly for the use in a fluid tank. Since the outer filter element in particular becomes clogged with particle contamination during use of the filter device, it is advisable to replace the said worn-out filter element with a new element, which also applies to the outer filter element that is at least partially worn out due to particle contamination despite the inner filter element. It is for example provided that the filter fineness of the innermost filter element is finer than that of the outermost filter element.

To stiffen the filter device, it may for example be provided that the inner filter element likewise has a perforated supporting tube in the direction of the cavity.

A media layer with coalescence properties suitable for this purpose can be used for the separating device referred to or on the inner circumference side of the outer filter element, said layer consisting, for example, of a non-woven fabric with a predetermined pore size gradient which, starting from an innermost fine structure, is increasingly transformed into a coarse structure when viewed towards the outflow side which, when fluid flows through the outer filter element, results in the bubbles, which are routinely dispersed very finely in the fluid, being combined into volumetrically larger units due to the coalescence property of the media layer which in this respect is designed as a discharge layer. The fibre material for example used here, routinely in the form of a non-woven fabric, can comprise polyester fibres which facilitates the degassing processes from the fluid.

Irrespective of this, any other type of media layer can also be used as a barrier layer which is suitable for the formation of large air bubbles, in particular a bulky, fibrous 3D matrix can serve as a degassing barrier layer.

In particular, it is also possible to form the discharge layer on the inside of the outer filter element from a lattice, mesh or fabric structure, it being possible for the said discharge layer to be formed of a plurality of media layers of the same or different type. Thus, a plurality of lattice or mesh structures with different opening widths, placed one on top of the other as individual layers, can be used for degassing or the combination of such mesh or lattice structures with suitable non-woven fabrics or with a 3D matrix, as described above.

The filter device is explained in greater detail below with reference to an embodiment according to the drawing. The drawings show in principle and not to scale. Specific references to components, process steps, and other elements are not intended to be limiting. Further, it is understood that like parts bear the same or similar reference numerals when referring to alternate FIGS.

FIG. 1 shows a longitudinal section through the filter device as a whole. This has two filter elements 12, 14 arranged coaxially with one another along a common longitudinal axis 10 (see FIG. 3) which define a circumferential annular cavity 16 between them on the outer or inner circumferential side respectively. The inside 18 of the outer filter element 14, which is directed towards the cavity 16, has a separating device 20 for gas bubbles, such as air bubbles, the cavity 16, according to the illustration shown in the FIGS. opening out at the head-end into individual discharge openings 22 for said gas bubbles. The two filter elements 12, 14 are placed one inside the other and accommodated in each case at the foot and head end in a common end cap 24, 26, the respective discharge opening 22 being formed of a passage, such as a drilled hole, in the head-end end cap 26 which connects the cavity 16 between the filter elements 12, 14 to the environment 28.

The respective end cap 24 and 26 is formed integrally and has annular receptacles 30 in which the free end faces of the respective filter element 12, 14 are accommodated; in particular, the said receptacles 30 form a kind of adhesive bed via which the respective filter element 12, 14 is permanently connected on the face end to the end caps 24, 26. For ease of illustration, the respective adhesive bed is omitted in the FIGS. the respective adhesive bed extending between limiting webs 32 of the individual receptacles 30.

The head-end end cap 26 with its respective discharge opening 22 is overlapped with a predefinable gap by a plate-like cover cap 34. The cover cap 34 forms a self-contained circular surface on its upper side and is provided with a circumferential rim 36 protruding downwards towards its circumferential end, as viewed in the direction of FIG. 1, which rim maintains a radial gap from the outermost circumferential limiting web 32. In an embodiment not shown in greater detail, there is also the option from a production point of view to omit the protruding rim 36 so that the upper end cap 26 and the cover cap 34 substantially form two guide surfaces for the gas-containing fluid which are parallel to each other. Furthermore, the free end-face end 38 of the circumferential rim 36 opens out above the lower end 40 of the outermost limiting web 32, the free annular edge 40 of this web 32 formed in this respect extending parallel to the free end-face annular edge 38 of the circumferential rim 36. Arranged coaxially with respect to the longitudinal axis 10, the cover cap 34 has a protrusion 42 along its lower surface which engages with a pin-like extension 44 in a blind hole 46 of a flow guidance element 48. In this case, the plate-like protrusion 42 overlaps the blind hole 46 on the edge and rests flush on the upper side of the flow guidance element 48 as part of the head-end end cap 26. In this respect, the axial height of the protrusion 42, viewed parallel to the longitudinal axis 10, determines the predefinable gap between the head-end end cap 26 and the cover cap 34 and, to this extent, specifies the gap dimension for an annular gap 50 which, in this respect, is formed in the region of the overlap from the cover cap 34 to the head-end end cap 26. In this respect, this annular gap 50 continues on the outer circumference with the same distance between the outermost upper limiting web 32 and the downwardly protruding circumferential rim 36 of the cover cap 34. In this respect, the fluid originating from the respective discharge opening 22 is guided via the annular gap 50 onto the outer circumference side 52 of the outer hollow cylindrical filter element 14. In particular, the aforementioned outer circumference side 52 of the outer filter element 14 is formed of a perforated supporting tube 54, which is provided with symmetrically distributed punched holes for this purpose, as shown. A further similarly configured supporting tube 56 forms the outer circumference side for the inner filter element 12.

As FIG. 1 in particular further shows, a plurality of discharge openings 22, for example between two and twelve, which completely penetrate the central limiting web 32 on the head-end end cap 26 and thus establish a fluid connection between the circumferential annular 50 the annular gap and cavity 16, are provided diametrically opposite each other with respect to the longitudinal axis 10. In this respect, the discharge openings 22 extend uniformly with defined radial spacing along a notional circle coaxial with the longitudinal axis 10. In accordance with an embodiment that is not shown, the cover cap 34 can also be an integral component of the head-end end cap 26. The discharge openings 22, each formed as drilled holes in the central limiting web 32, form duct-like extensions on the upper side of the cavity 16 and are all provided with the same bore length and the same bore diameter. The innermost annular limiting web 32 on the foot-end end cap 24 forms a receiving ring 58 in which a circumferential groove for a sealing ring 60 (see FIG. 3) is incorporated on the base end. The aforementioned receiving ring 58 is used, as shown in FIG. 3, for fixing a filter device according to FIGS. 1 and 2 on an inlet stub 62 which is joined at the base end to a tank housing 64 of a fluid tank of conventional design, with the result that it will not be discussed in greater detail at this point, and in particular the tank in FIG. 3 is shown in a greatly simplified manner with only 4 limiting walls 66. As further shown in FIG. 1, the flow guidance element 48 is directed on the head end to the hollow cylindrical inside of the inner filter element 12 and opens out into the interior of the hollow cylindrical filter element 12, tapering conically in the direction of the longitudinal axis 10.

Figure 2:
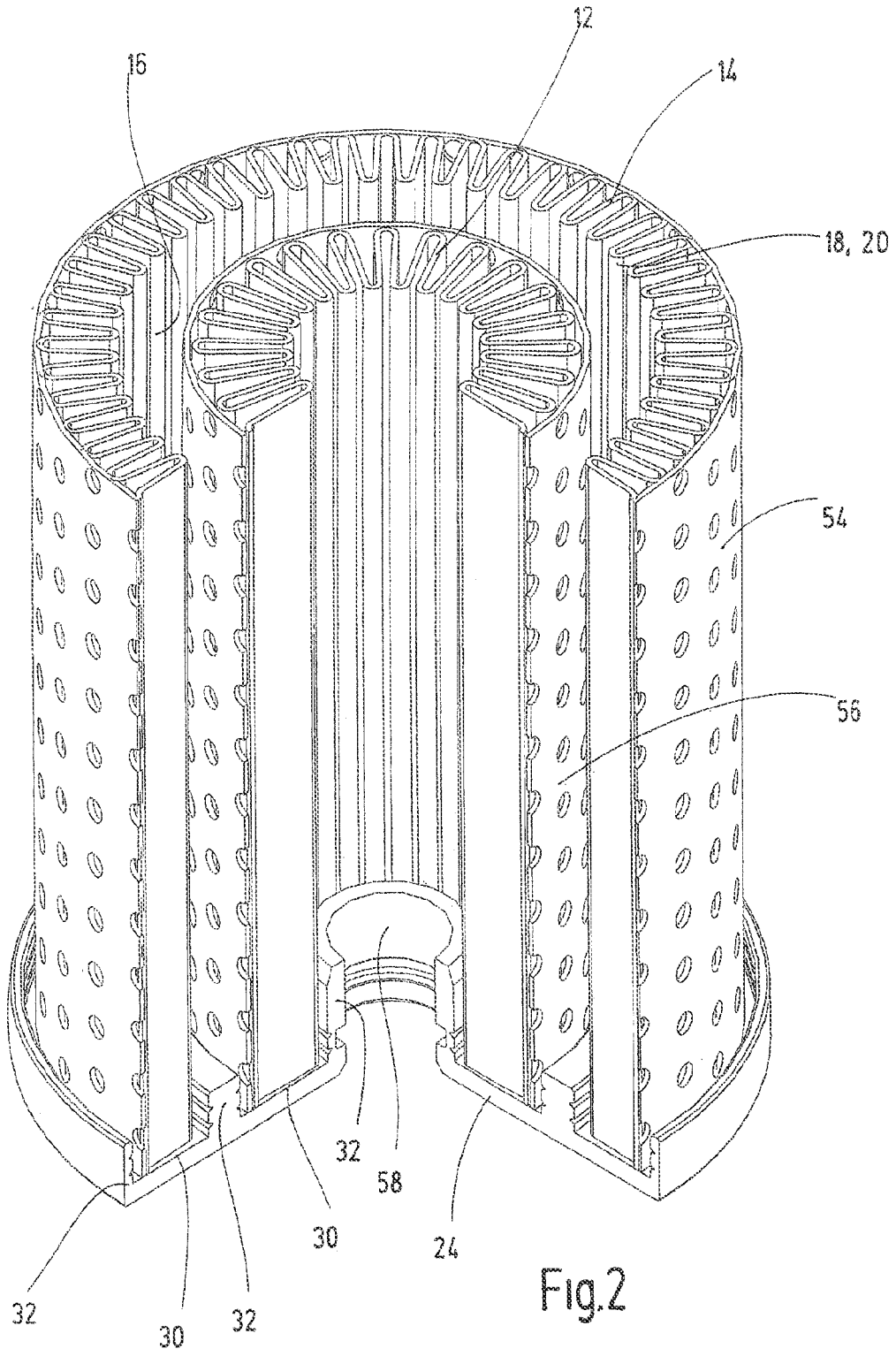
FIG. 2 shows the filter device according to FIG. 1 without head-end end cap and cover cap, in a partially cut-away perspective view.
Figure 3:
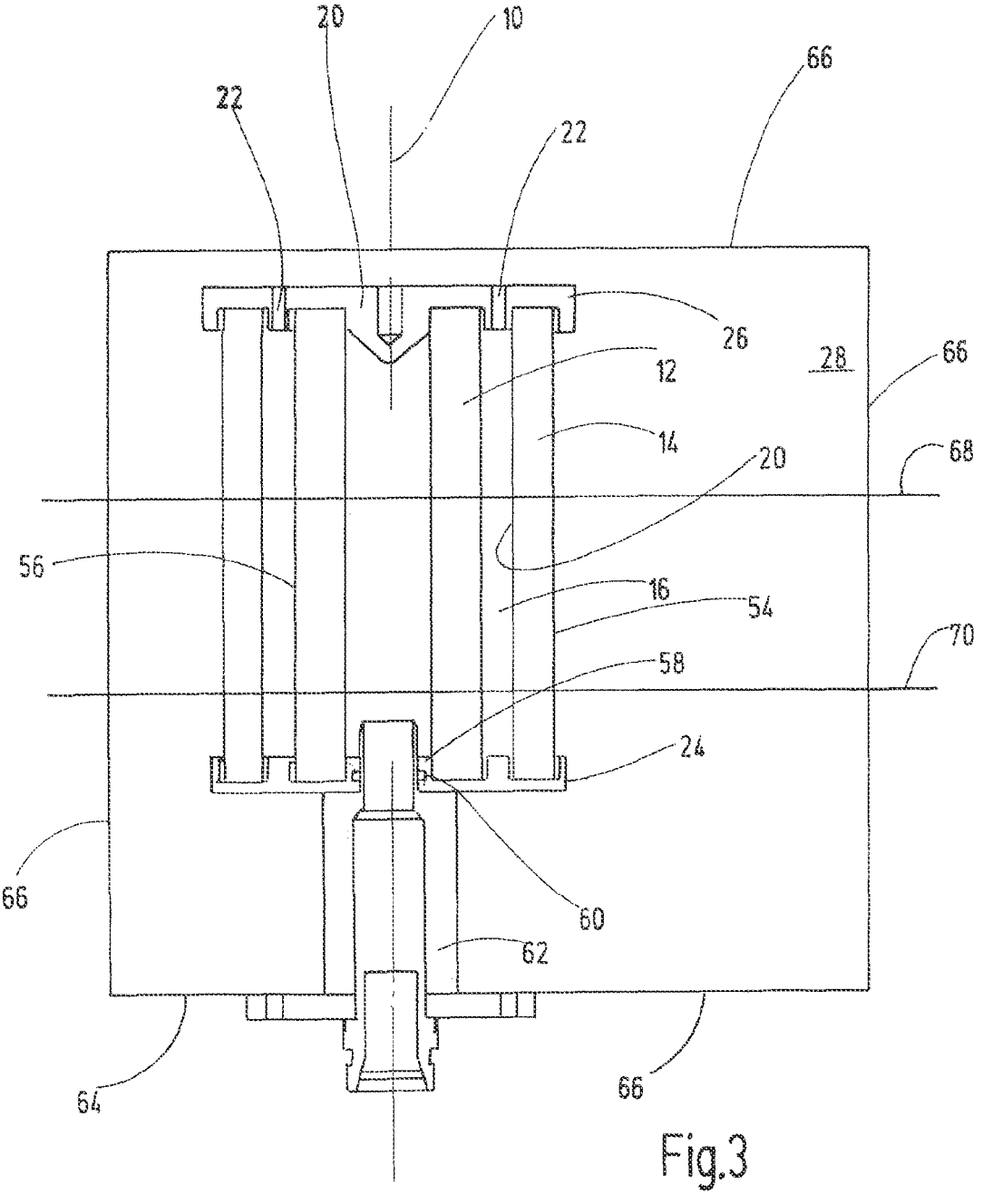
FIG. 3 in a highly simplified diagram, an example installation situation for a filter device according to FIGS. 1 and 2 in a fluid storage tank.

As shown in particular in the partially cut-away perspective view of the filter device according to FIG. 2, the two filter elements 12, 14 are pleated. In this respect, the pleated filter mat structure can have a multi-layer construction depending on the functionality of the filter, which is known in prior art. On the outer circumference, the respective pleating is supported on the outer supporting tube 54 for the outer filter element 14 and on the further supporting tube 56 for the inner filter element 12. The innermost filter element 12 is used mainly for particle filtration, i.e. for removing particulate contamination from the fluid flow, whereas in contrast the filter element 14 is used mainly for degassing the fluid. The pleat height selected in each case ranges from 5 to 35 mm and for example 3-layer to 7-layer filter mats are used for the two filter elements 12, 14. A pleat density for the respective element 12, 14 of between 1 and 10 pleats is for example selected. The separating device 20, which is arranged on the inside 18 of the outer filter element 14, is for example folded into the other pleat composite of the outer filter element 14; however, it is also possible to arrange the separating device, for example as a hollow cylindrical body (not shown), as a separate component along the inner circumference side 18 of the outer filter element 14. The aforementioned hollow cylindrical body can be formed by a coalescing supporting structure, for example in the form of a supporting tube with surrounding PET film. However, it is possible to fold in the separating device which for example consists of a plurality of layers of a lattice, mesh or fabric structure, it being possible for each layer to have a mesh size of between 10 and 1200 µm. The layer used in each case can consist of stainless steel or plastic material. No further supporting tube is provided on the respective inner circumference side of the filter element s 12, 14, and since the flow through the respective element 12, 14 is from inside to outside, in this respect it is sufficient to support the respective element material on the outer supporting tubes 54, 56. In this respect, therefore, the separating device 20 is a cascading mesh fabric made of plastic or stainless steel which is pleated and has a multi-layer structure. The following weaves can be used for the respective mesh fabric, a twill weave, a satin weave or, in the simplest case, a plain weave. The following types of weave in particular can be used: 1-1 weave, 2-2 weave, 4-1 weave, 5-1 weave, 2-1 weave. It has proven particularly useful to use a plain weave (1-1 weave) for the two outer layers and a so-called 3-twill weave or 2-1 weave for the middle layer.

The diagram according to FIG. 3 shows a common installation situation in a tank housing 64 of a fluid storage tank where, according to the diagram of FIG. 3, the filter device as a whole is placed via its lower receiving ring 58 onto the inlet stub 62 of the tank, namely in a sealed manner by means of the sealing ring 60 in the associated receiving groove of the ring 58. Furthermore, for easier understanding and by way of example, FIG. 3 shows an average fill level 68 and a minimum fill level 70. In addition, for removing air from the interior of the tank, a venting means (not shown) can be present, for example on the upper tank wall 66, as well as a drainage means on the underside of the tank for fluid cleaned of particulate contamination and degassed, the aforementioned drainage means likewise not being shown for the sake of simplicity.

During operation of the filter device, the fluid to be treated, for example in the form of a common hydraulic oil, flows via the inlet stub 62 into the interior of the innermost filter element 12, where cleaning of particulate contamination accordingly takes place in that the fluid, passing through the filter element 12, travels from inside to outside and into the cavity 16 between the elements 12, 14. The fluid cleaned in this manner can then, with further cleaning if necessary, also pass through the outer filter element 14 and in this respect into the interior of the tank housing 64. With the aforementioned fluid passage, the flow also passes through the lattice- or mesh-like separating device 20 on the inside of the outer filter element 14, the aforementioned separating device 20 forming a kind of barrier layer for gas, such as air, with the result that initially finely distributed gas bubbles coalesce in the fluid in dispersed form into larger bubbles and accordingly rise upwards as viewed in the direction of FIG. 3, always above the fluid level 68, 70 present in the tank at any one time. The gas bubbles or air bubbles rising upwards in this manner then exit via the respective upper discharge opening 22 onto the air side (environment 28) in the interior of the tank housing 64. As the diagram according to FIG. 3 shows, the filter device basically manages even without the cover cap 34, although its presence implies corresponding benefits, in particular since the separated air may still be wetted with liquid, which is discharged in a beneficial manner, also as foam, to the outside via the cover cap 34 together with the annular gap 50 formed, the aforementioned liquid there being able to trickle downwards via the outer supporting tube 54 of the filter element 14 to the liquid side 68, 70 of the tank.

As FIG. 3 further shows, the annular cavity 16 is defined by the filter elements 12, 14 running parallel to each other, so that a kind of parallel flow for the rising air bubbles is enforced in the cavity 16 which increases the flow velocity for the gas to be discharged and thus the separation efficiency of the filter device as a whole. The conical flow guidance element 48 on the underside of the head-end end cap 26 also contributes to this, ensuring that any air collected on the hollow cylindrical inside of the inner filter element 12 is discharged towards the discharge openings 22 which in contrast are located on the outside, as part of flow guidance. In particular, the plate geometry of the cover cap 34 ensures that the fluid (liquid with gas) flowing upwards through the drilled holes 22 is directed homogeneously outwards towards the outer supporting tube 54. This thus has no equivalent in prior art.

In addition to the aforementioned bonding of the end caps 24, 26 to the associated filter elements 12, 14, common capping processes are also used and both end caps 24, 26 and the supporting tubes 54, 56 can be produced in a simple and cost-efficient manner by means of conventional processes (machining, plastic injection 3D moulding, printing, etc.), it being possible for the aforementioned components of the filter device to be constructed of metal and/or plastic materials. Furthermore, the filter device can basically be used for all gas-containing fluids and is not limited to discharging air from hydraulic oil.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A filter device comprising at least of two filter elements arranged coaxially with each other which define a cavity between them; wherein the inside of an outer filter element of the two filter elements, which is directed towards the cavity, has at least in some part a separating device for gas bubbles;

the cavity opens at a head end into at least one discharge opening for such gas bubbles;

the two filter elements are accommodated at the foot and head end in at least a foot-end end cap and a head-end end cap, respectively, the at least one discharge opening is formed of a passage in the head-end end cap, which connects the cavity between the filter elements to the environment;

the head-end end cap with its discharge opening is overlapped with a predefinable gap by a cover cap; and wherein an annular gap is formed in the region of the overlap from the cover cap to the head-end end cap, via which annular gap the respective fluid originating from a discharge opening is guided to an outer circumference side of the outer filter element, which outer filter element is formed hollow and cylindrical.

2. The filter device of claim 1, wherein the outer circumference side of the outer filter element is formed of a perforated supporting tube.

3. The filter device of claim 1, wherein one of the two filter elements is an inner hollow cylindrical filter element and a flow guidance element is arranged on the inside of the inner hollow cylindrical filter element in the region of the head-end end cap.

4. The filter device of claim 3, wherein the head-end end cap is connected to the cover cap in the region of the flow guidance element.

5. The filter device of claim 1, wherein the two filter elements, the end caps, and the cover cap form a replaceable assembly for use in a fluid tank.

6. The filter device of claim 1, wherein an inner filter element of the two filter elements has a perforated supporting tube in the direction of the cavity.

7. The filter device of claim 1, wherein the separation device on the inside of the outer filter element is formed of a lattice, mesh or fabric structure.

8. The filter device of claim 1, wherein the separating device is configured for air bubbles.

9. The filter device of claim 2, wherein one of the two filter elements is an inner hollow cylindrical filter element and a flow guidance element is arranged on the inside of the inner hollow cylindrical filter element in the region of the head-end end cap.

10. The filter device of claim 2, wherein the head-end end cap is connected to the cover cap in the region of the flow guidance element.

11. The filter device of claim 3, wherein the head-end end cap is connected to the cover cap in the region of the flow guidance element.

* * * * *